United States Patent [19]

Oltman

[11] 4,101,004
[45] Jul. 18, 1978

[54] DRIVE AND STEERING APPARATUS

[76] Inventor: Herbert D. Oltman, 605 Second St., Hampton, Ill. 61256

[21] Appl. No.: 764,050

[22] Filed: Jan. 31, 1977

[51] Int. Cl.² ............................................. B62D 11/08
[52] U.S. Cl. .................................... 180/6.2; 192/13 R
[58] Field of Search .................... 180/6.2, 6.7, 6.48; 192/13 R, 17 A

[56] References Cited

U.S. PATENT DOCUMENTS

| | | | |
|---|---|---|---|
| 2,522,089 | 9/1950 | Bridwell | 192/17 A |
| 2,757,373 | 7/1956 | Marrie | 180/6.2 |
| 3,398,819 | 8/1968 | Ruhl | 192/13 R X |
| 3,623,565 | 11/1971 | Ward | 180/6.2 |
| 3,907,052 | 9/1975 | Shaw | 192/13 R X |

Primary Examiner—Joseph F. Peters, Jr.
Assistant Examiner—R. Schrecengost
Attorney, Agent, or Firm—Henderson, Strom, Sturm, Cepican & Fix

[57] ABSTRACT

A drive and steering apparatus for a vehicle of a type having ground engaging wheels or tracks on each side thereof. A shaft rotatably connected to the frame of the vehicle is selectively rotated by a motor through a drive train. A first drive assembly is rotatably disposed on one side of the shaft and a second drive assembly is rotatably disposed on the other side of the shaft. A first clutch mechanism is attached to the shaft and is selectively movable between positions in contact with the first drive assembly and out of contact with the first drive assembly. A first brake mechanism is attached to the frame and is selectively movable between positions in and out of contact with the first drive assembly. A first control mechanism is provided for simultaneously controlling the position of the first clutch mechanism and the first brake mechanism with respect to the first drive assembly, the first control means having a neutral position whereby the first clutch mechanism and the first brake mechanism are spaced from the first drive assembly, a driving position whereby the first clutch mechanism is in contact with the first drive assembly and the first brake mechanism is out of contact with the first drive assembly, and a braking position whereby the first clutch mechanism is out of contact with the first drive assembly and the first brake mechanism is in contact with the first drive assembly. The second drive assembly, second clutch mechanism, second brake mechanism, and second control mechanism operate substantially identically on the other side of the vehicle as the first drive assembly, first clutch mechanism, first brake mechanism and first control mechanism respectively, whereby the drive and steering of the vehicle can be controlled.

5 Claims, 12 Drawing Figures

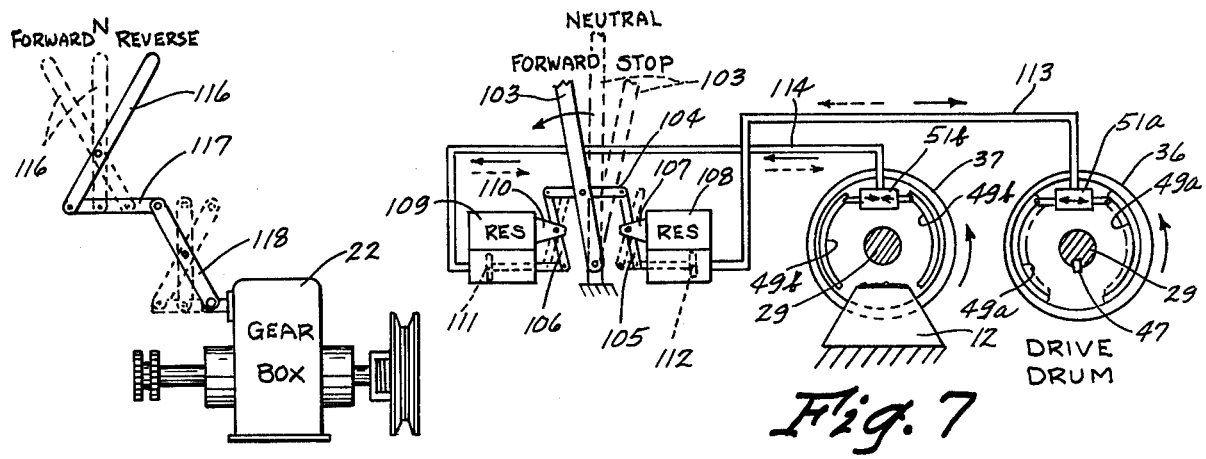
Fig. 7
Fig. 6
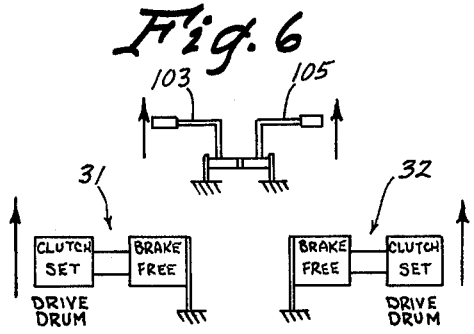
Fig. 8 FORWARD
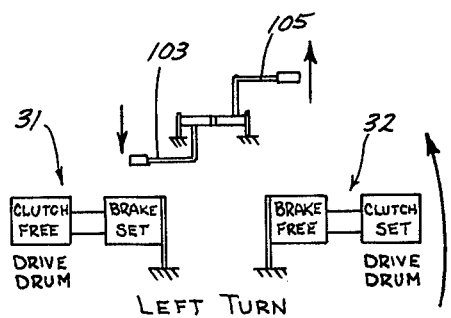
Fig. 9 LEFT TURN
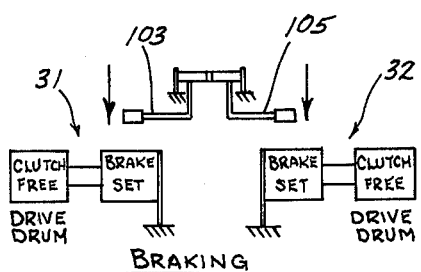
Fig. 10 BRAKING
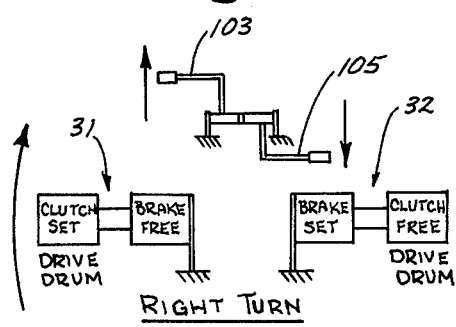
Fig. 11 RIGHT TURN
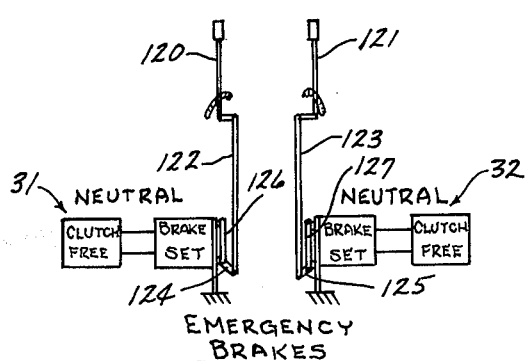
Fig. 12 EMERGENCY BRAKES 4,101,004

DRIVE AND STEERING APPARATUS

BACKGROUND OF THE INVENTION

The present invention relates generally to an apparatus for transmitting motion to a vehicle, and more particularily to a novel drive and steering apparatus for a vehicle.

In certain types of vehicles such as so called all-terrain vehicles, the drive systems have usually included a series of sprockets and chains controlled by a pair of control levers. One of the levers controls the wheels on one side of the vehicle and the other lever controls the wheels on the other side of the vehicle. Moving a lever forward causes the wheels on that respective side to turn, and moving a lever rearwardly caused the wheels on that respective side to brake. A central position of the lever is neutral and has no effect on the wheels.

Consequently, the prior art vehicle control could be used to cause the vehicle to be moved forwardly when the gearbox is turning forward by moving both levers forwardly, turned to the left by moving the left lever back while holding the right lever forward, and turning right by moving the left lever forward and the right lever back. Therefore, people have become accustomed to this type of steering system in certain types of vehicles.

There have been dependability problems with such sprocket and chain systems, however, which have never been satisfactorily solved. There is therefore a need for a more dependable system which uses the traditional steering system referred to above.

SUMMARY OF THE INVENTION

The present invention relates to a drive and steering apparatus for a vehicle of a type having ground engaging wheels on tracks on each side thereof. A shaft is rotatably attached to the frame of the vehicle and the shaft is rotated by a motor, through a drive train. A first drive assembly is rotatably disposed on one side of the shaft and a second drive assembly is rotatably disposed on the other side of the shaft. A first clutch mechanism is attached to the shaft and is selectively movable between positions in contact with the first drive assembly. A first brake mechanism is attached to the frame and is selectively movable between positions in and out of contact with the first drive assembly. A first control mechanism is provided for simultaneously controlling the position of the first clutch mechanism and the first brake mechanism with respect to the first drive assembly, the first control means having a neutral position whereby the first clutch mechanism and the first brake mechanism are spaced from the first drive assembly, a driving position whereby the first clutch mechanism is in contact with the first drive assembly and the first brake mechanism is out of contact with the first drive assembly, and a braking position whereby the first clutch mechanism is out of contact with the first drive assembly and the first brake mechanism is in contact with the first drive assembly. The second drive assembly, second clutch mechanism, second brake mechanism, and second control mechanism operate substantially identically on the other side of the vehicle as the first drive assembly, first clutch mechanism, first brake mechanism and first control mechanism respectively, whereby the drive and steering of the vehicle can be controlled.

An object of the present invention is to provide an improved drive and steering apparatus for a vehicle.

Another object of the invention is to provide a drive and steering apparatus which is more efficient so as to prevent large power losses present in prior art devices.

A further object of the invention is to provide a drive and steering apparatus which is economical to manufacture and easy to assemble.

Still another object is to provide a drive and steering apparatus which is extremely dependable and which requires little upkeep and maintenance.

Other objects, advantages, and novel features of the present invention will become apparent from the following detailed description of the invention when considered in conjunction with the accompanying drawings.

BRIEF DESCRIPTION OF THE DRAWINGS

FIG. 6 is a view of a gear box of the present invention and showing the actuating linkage thereof;

FIG. 7 is a schematic view showing the clutch and braking control for one side of the vehicle;

FIG. 8 is a schematic view showing the positions of the control levers and the corresponding positions of the clutch and braking mechanisms when the gear box is in a forward position and the control levers are fully forward to cause the vehicle to move forwardly;

FIG. 9 is a view like FIG. 8 but showing schematically the positions of the control members for making a left turn;

FIG. 10 is a schematic view like FIG. 8 but showing the control members in a braking position;

FIG. 11 is a view like FIG. 8 but showing the control members in a position to cause the vehicle to make a right turn; and FIG. 12 is a schematic view showing the emergency brakes on.

DESCRIPTION OF THE PREFERRED EMBODIMENT

Figure 1:
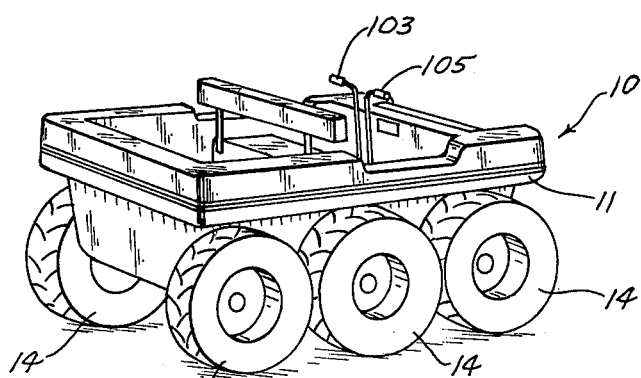
FIG. 1 is a perspective view of a vehicle utilizing the present invention.
Figure 2:
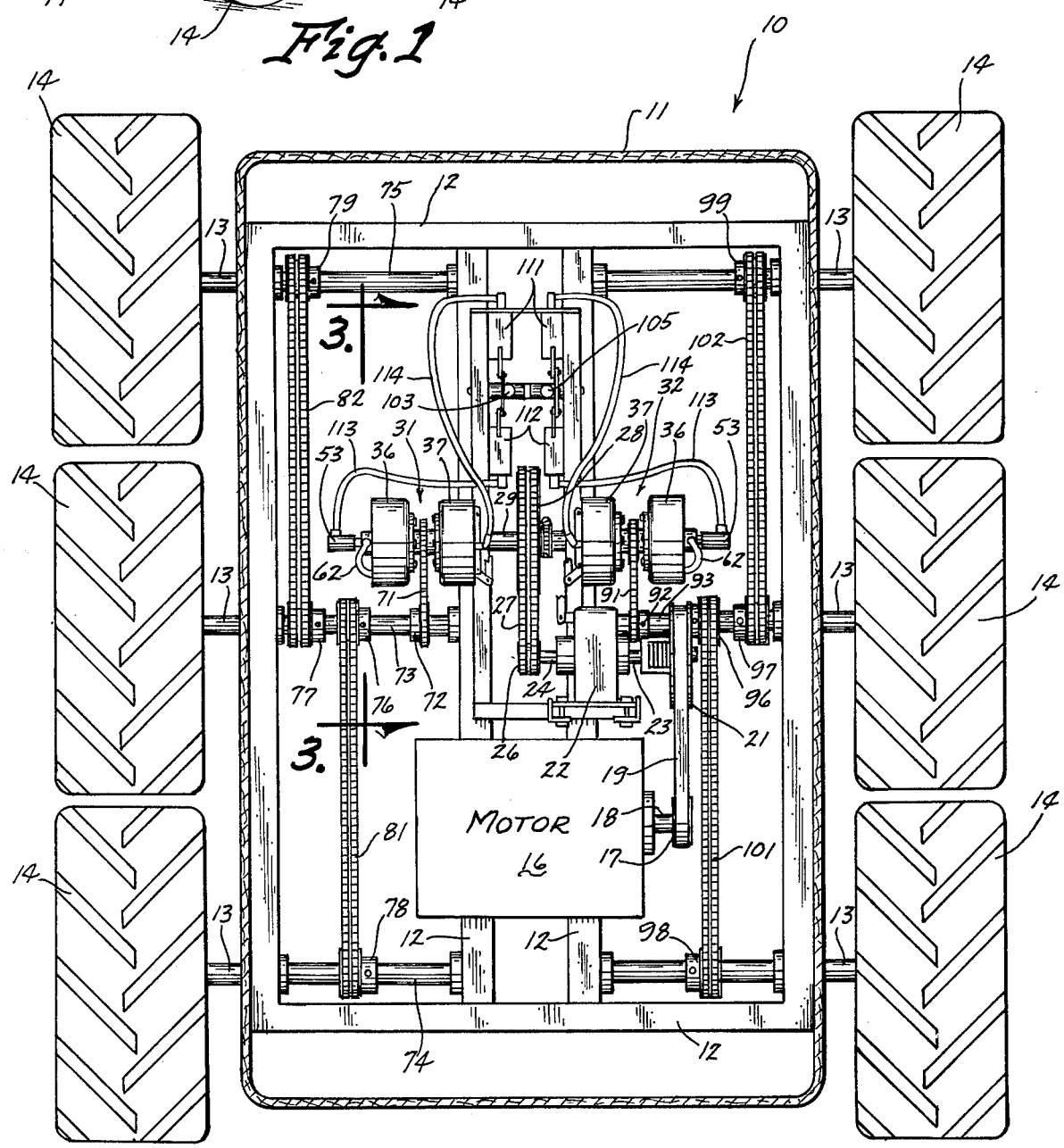
FIG. 2 is a cross-sectional view to the body of the vehicle of FIG. 1 showing a plan view of the interior workings of the vehicle.

Referring now to the drawings wherein like reference numerals designate identical or corresponding parts throughout the several views, FIG. 1 shows an all-terrain vehicle 10 utilizing the drive and steering apparatus of the present invention. The vehicle 10 has a fiberglass reinforced body section 11 which is attached to a frame 12 (FIG. 2). A plurality of axles 13 are rotatably mounted to the frame 12 and rubber wheels 14 are rigidly affixed to the ends of these axles 13. An internal combustion engine 16 is rigidly affixed to the frame 12 and it is this motor 16 which ultimately serves to propel the vehicle from place to place. A pulley 17 is rigidly attached to the power outlet shaft 18 of the motor 16 and a belt 19 is disposed around the pulley 17 and around a pulley 21.

Figure 3:
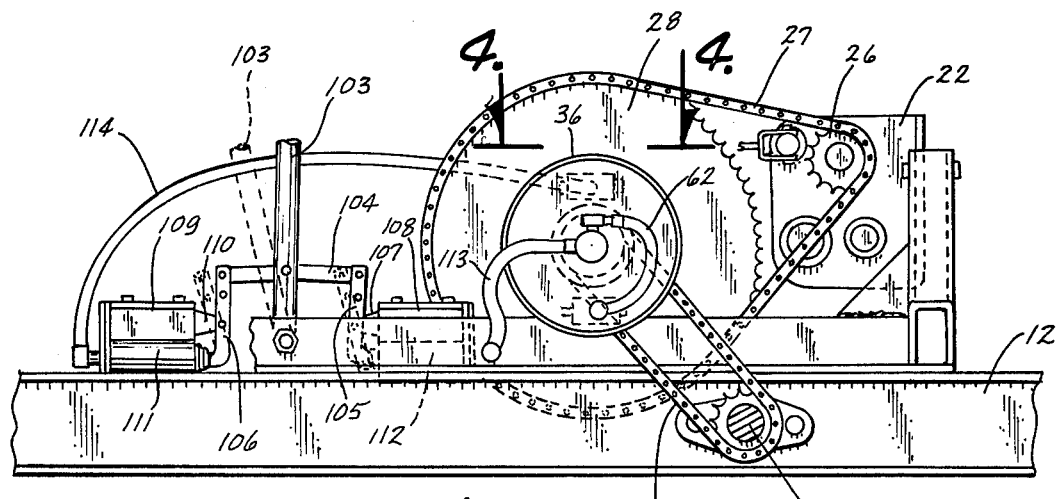
FIG. 3 is a partial enlarged view taken along line 3—3 of FIG. 2.
Figure 4:
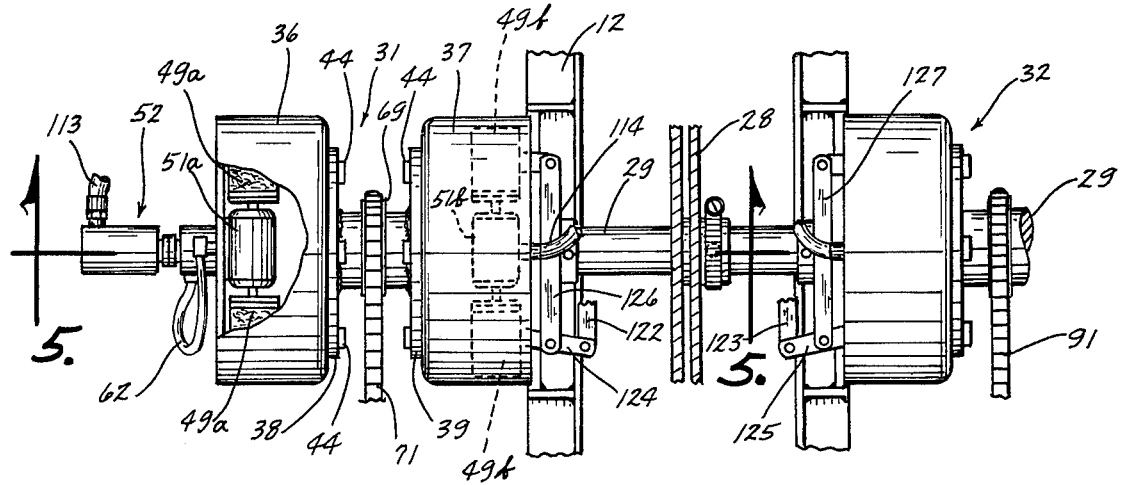
FIG. 4 is a view taken along line 4—4 of FIG. 3.
Figure 5:
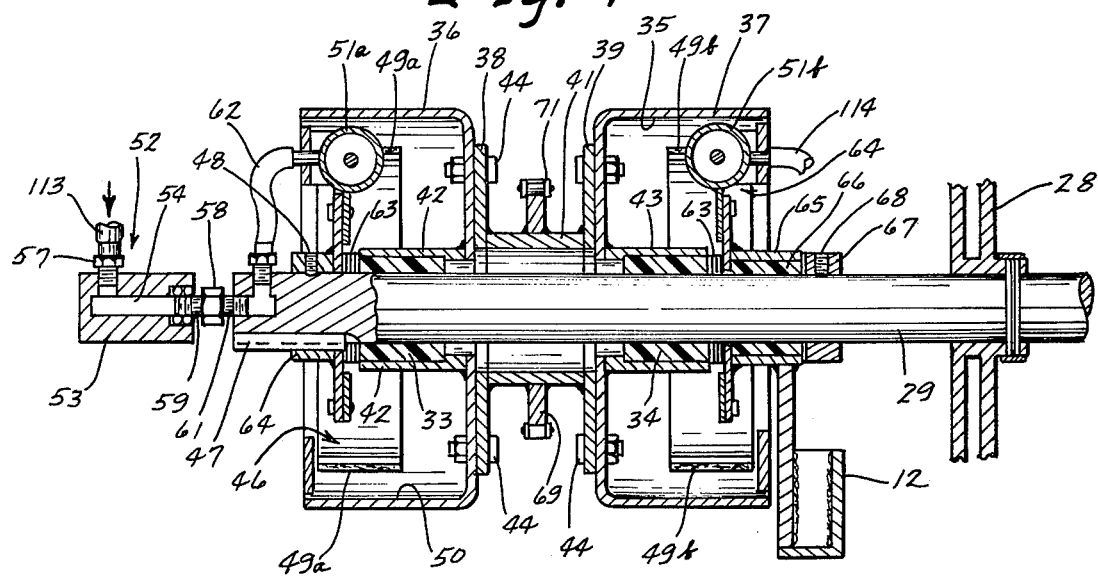
FIG. 5 is a cross-sectional view taken along line 5—5 of FIG. 4.

A gear box 22 is rigidly attached to the frame 12. An input shaft 23 has a pulley 21 rigidly connected thereto and an output shaft 24 has an output sprocket 26 rigidly attached thereto. A chain or belt 27 is disposed around the sprocket 26 and around a larger sprocket 28. This large sprocket 28 (FIG. 3) is rigidly attached to a shaft 29.

Consequently, it can be easily appreciated that the shaft 29 can be caused to rotate when the motor 16 is running and turning the pulley 17. This rotary motion of pulley 17 is transmitted to the gear box 22 through the belt 19 and pulley 21 and will rotate the shaft 24 in one of two directions, which can be controlled, or the gear box 22 can be placed in neutral as will be appreciated from viewing FIG. 6. The motion transmitted from the gear box 22 is then further transmitted by sprockets 26 and 28 through belt 27 to the shaft 29.

A first drive assembly 31 is rotatably attached to one end of the shaft 29 and a second drive assembly 32 is rotatably attached to the other end of the shaft 29 as can be seen in FIGS. 2-5. Nylon bearings 33 and 34 are provided for reducing the friction of this rotational mounting of the drive assemblies 31 and 32 to the shaft 29. The first drive assembly 31 is comprised primarily of a pair of cylinders 36 and 37 which are rigidly attached together by members 38, 39 and 41. Furthermore, the bearing holding member 42 holds bearing 33 in place and is rigidly attached to cylinder 36. A member 43 is rigidly attached to cylinder 37 to hold the bearing 34 in place. The nut and bolt assemblies 44 serve to rigidly affix the members 38 and 39 respectively to the cylinders 36 and 37.

A brake shoe assembly 46 is rigidly attached to the shaft 29 by means of a key 47 and a set screw 48. This brake shoe assembly 46 is not critical in its design and could be one of many kinds which are conventionally used as braking systems for automobiles. This brake shoe assembly does include a pair of shoes 49 which are biased radially inwardly in a conventional manner, and which are selectively movable radially outwardly when fluid is introduced into the cylinder 51. This cylinder 51 is also conventional as in automobile brakes and has a pair of pistons inside which when fluid is introduced between the pistons serves to push the shoes 49 outwardly against the inside of the brake cylinder 36 against a first frictional surface 50, which frictional surface 50 is annular in shape. It is important to note that since the shaft 29 is rotating and since the first brake shoe assembly 46 is rigidly attached to the shaft 29, that a swivel connection of some kind such as 52 needs to be provided so as to be able to get the fluid into and out from the cylinder 51. The cylinder 52 is comprised out of a cylindrical member 53 having an internal passageway 54 therein. This internal passageway 54 is in fluid communication with a hydraulic hose 113 through a coupling 57. The member 52 stays stationary with respect to the frame 12 and member 58 serves to seal the members 59 and 61 together since this member 61 rotates with respect to member 59. Members 59 and 61 serve to communicate the fluid from the hose 113 up through the hose 62 and into and out from the cylinder 51.

Spacers such as washer-shaped members 63 are provided between the collar 64 and the member 42 in order to get the proper spacing of the drive assembly 31 with respect to the brake shoe assembly 46.

Referring again to FIG. 5 and the other side of the drive assembly 31, it is noted that a second brake shoe assembly 64 is provided. This brake shoe assembly 64 is substantially identical to the brake shoe assembly 46 on the other side, except for the fact that it is attached rigidly to the frame 12 and is stabalized by allowing the shaft 29 to rotate within nylon bearing member 66. Spacing washer 63 are again used to make sure that brake shoe assembly 64 is tight along with a collar member 67 which is rigidly affixed to the shaft 29 by means of a set screw 68.

The brake shoe assembly 46 is to be considered the clutch mechanism of this invention in conjunction with the brake cylinder 36 and the brake shoe assembly 54 is the primary part of the braking mechanism in conjunction with the brake shoe 37 of the first drive assembly 31.

A sprocket member 69 is rigidly attached to the member 41 of the first drive assembly 31 and this sprocket 69 has a chain 71 disposed therearound. The chain 71 is also disposed around another sprocket 72 which is rigidly attached to a shaft 73 which can be considered to be one and the same with the leftmost middle one of the shafts 13 as shown in FIG. 2. When the drive assembly 31 is rotated, this motion is transmitted through sprockets 69 and 72 through chain 71 to the shaft 73. This rotary motion is then also transmitted to the shafts 74 and 75 through chain and sprocket arrangements. Sprockets 76 and 77 are rigidly attached to the shaft 73 (FIG. 2) and sprockets 78 and 79 are rigidly attached to shafts 74 and 75 respectively. A chain 81 is disposed around the sprocket 76 and 78 and a chain 82 is disposed around the sprocket 77 and 79. The members 91–102 on the right side of the vehicle as shown in FIG. 2 work in conjunction with the second drive assembly 32 substantially in the same way that the corresponding elements 71–82 function with respect to the first drive assembly 31, such that it is not believed to be necessary to go into detail into the operation of the elements 91–102.

The operation of the drive assembly 31 is substantially shown schematically in FIG. 7. Assume that the shaft 29 is rotating in a direction to transmit forward motion to the vehicle, then if the lever 103 is moved to the forward position as shown in solid lines in FIG. 7, then the linkage members 104–106 move pistons 111 and 112 so as to force fluid into the line 113 and therefor into the cylinder 51a and allow the fluid to return in fluid line 114 out of cylinder 51b. This action causes the shoes 49a to be pushed against the first frictional surface 50 and thereby to transmit the rotation of the shaft 29 to the drum cylinder 36. At the same time, the shoes 49b inside the other drum or cylinder 37 are allowed to move radially inwardly and be spaced from the interior of the drum 37 and away from the second frictional surface 35, consequently allowing the drum 37 to rotate freely with respect to the brake shoes 49 therein. Therefore, when the shift lever 103 is in the forward direction, the first drive assembly 31 is turning with the shaft 29 and this rotation is transmitted to the wheels on the left side through the series of sprockets and chains 71–82. When the handle 103 is moved to the neutral position, as shown in FIG. 7, then fluid is allowed to return to both of the lines 113 and 114 thereby having the shoes 49 spaced from the drum 36 and also from the drum 37 so that no motion is transmitted from the shaft 29 to the first drive assembly 31 and no braking is applied to the first drive assembly 31. If the gearbox lever 116 is moved to a reverse position, then shaft 29 and the wheels 14 rotate in the opposite direction, but the drive and steering control are still operable to drive and steer in a reverse direction.

When the lever 103, shown in FIG. 7, is moved to the stop position, then the fluid moves in the direction of the dashed lines; that is, the fluid is forced into the line 114 and into the cylinder 51b to cause the shoes 49 within the drum 37 to be in engagement, thereby causing a braking of the wheels on the left side of the vehicle. At the same time, the fluid is allowed to return from the line 113 and the cylinder 51a so that the shoes 49a within the cylinder 36 are allowed to move radially inwardly and be spaced from the drum 36 so that there is no tendency of the motion of the shaft 29 to be transmitted to the drum 36 and thereby to the first drive assembly 31. It is to be understood that the other drive assembly 32 and its control lever 105 work in an identical fashion on the other side of the vehicle.

Accordingly, when it is desired to operate the all-terrain vehicle 10 shown in FIG. 1, the motor 16 is started. The lever 116 (FIG. 6) is then moved to whatever position is desired in order to cause the gear box to turn in one direction or the other, or to be in neutral and not turn at all. This motion of the lever 116 is transmitted to the gear box 22 through levers 117 and 118. The pivotal arrangements of these numbers will be clear from viewing the solid and dashed line arrangements of FIG. 6, but this shifting and lever mechanism is not important to this invention and other means can be used.

Assume, for example, that the gear box is shifted to a forward direction, then this motion from the gear box will be transmitted to the shaft 29 as described above. If it is desired to move the vehicle straight ahead, then the control levers 103 and 105 would be moved forwardly as shown in FIG. 8. When this is done, the clutch portion of the first drive assembly 31 would be engaged in order to transmit the motion of the shaft 29 to the first drive assembly 31 and to the left side wheels of the vehicle while the brake portion of the first drive assembly 31 would not be engaged and would therefore not tend to interfere with the transmission of power to the left wheels. The same thing would be happening on the right side with the clutch being set and the drive drum rotating without interference from the braking mechanism of the second drive assembly 32.

If it was desired to turn the vehicle to the left (FIG. 9), the rightmost handle 105 would be held in the same position (forward) and the leftmost handle 103 would be moved back towards the stopped position. Consequently, the right drive assembly 32 would be driving the right wheels while the leftmost drive assembly 31 would be braking the left set of wheels and the vehicle would thereby turn to the left.

If it was desired to brake the vehicle and bring it to a stop, both of the handles 103 and 105 would be moved rearwardly. This would, of course, cause the clutch portion of each of the drive assemblies to be free and not engage the rotating shaft 29, but the brake portion of each of the drive assemblies 31 and 32 would be engaged. In other words, the brake shoes 49b which are connected to the frame 12 would be forced outwardly against the inner surface of the brake drums 37 thereby forcing the drum 37 to cease rotating with respect to the frame, thereby causing the drive assemblies 31 and 32 to stop rotating. This, of course, prevents the wheels from rotating since they are linked together with chains and sprockets as explained above.

When it is desired to make a right turn with the vehicle (FIG. 11), the leftmost lever 103 is moved forwardly and the rightmost lever 105 is moved rearwardly. The leftmost lever being forward causes the clutch on the left side to be engaged to transmit rotation to the left side wheels and the fact that the lever 105 is moved rearwardly causes the rightmost wheels to brake and stop such that the vehicle will turn to the right.

FIG. 12 shows a linkage system including members 120-127 which is merely a mechanical linkage for causing the brake shoes 49 to be moved outwardly against the brake drum 37 in case of failure of the hydraulic system and to prevent the vehicle from moving when the vehicle is turned off and parked, or in the event of a failure of the primary braking system. The mechanical linkage of emergency brakes is not critical to this invention, since this emergency brake art is highly developed and almost any one of those prior art systems could be used to effect this emergency braking system.

Accordingly, it can be seen that the present invention does indeed accomplish the objects set forth above. Obviously many modifications and variations of the present invention are possible in light of the above teachings. It is therefore to be understood that, within the scope of the appended claims, the invention may be practiced otherwise than as specifically described.

I claim:

1. A drive and steering apparatus for a vehicle comprising:

a frame;

ground engaging means having a first side and a second side rotatably attached to said frame for moving said vehicle;

a shaft;

means for rotatably attaching said shaft to said frame;

means attached to said frame for rotating said shaft;

a first drive assembly, said first drive assembly having a first and a second frictional surface thereon, said first drive assembly including two drums rigidly connected together, said first and second frictional surfaces of said first drive assembly being located on an interior surface of the drums of said first drive assembly;

means for rotatably mounting said first drive assembly on said shaft;

means for transmitting rotary motion of said first drive assembly to the first side of said ground engaging means;

a first clutch means attached to said shaft, said first clutch means being movable between a first position in frictional contact with said first frictional surface of the first drive assembly whereby said first drive assembly rotates with said shaft, and a second position whereby said first clutch means is spaced from said first frictional surface of the first drive assembly whereby rotational movement of said shaft is not transmitted to said first drive assembly, said first clutch means comprising a hydraulically actuated shoe;

a first brake means attached to said frame, said first brake means being movable between a first position in frictional contact with said second frictional surface of the first drive assembly whereby said first drive assembly is prevented from rotating and a second position whereby said first brake means is spaced from said second frictional surface of the first drive assembly whereby said first drive assembly is allowed to rotate, said first brake means comprising a hydraulically actuated shoe;

first control means for simultaneously controlling said first clutch means and said first brake means, said first control means having a neutral position whereby the first clutch means and the first brake means are in the second positions thereof respectively, a driving position whereby said first clutch means is in the first position thereof and the first brake means is in the second position thereof, and a braking position whereby said first clutch means is in said second position thereof and said first brake means is in the first position thereof;

a second drive assembly, said second drive assembly having a first and a second frictional surface thereon;

means for rotatably mounting said second drive assembly on said shaft;

means for transmitting rotary motion of said second drive assembly to the second side of said ground engaging means;

a second clutch means attached to said shaft, said second clutch means being movable between a first position in frictional contact with said first frictional surface of the second drive assembly whereby said second drive assembly rotates with said shaft, and a second position whereby said second clutch means is spaced from said first frictional surface of the second drive assembly whereby rotational movement of said shaft is not transmitted to said second drive assembly;

a second brake means attached to said frame, said second brake means being movable between a first position in frictional contact with said second frictional surface of the second drive assembly whereby said second drive assembly is prevented from rotating and a second position whereby said second brake means is spaced from said second frictional surface of the second drive assembly whereby said second drive assembly is allowed to rotate; and second control means for simultaneously controlling said second clutch means and said second brake means, said second control means having a neutral position whereby the second clutch means and the second brake means are in the second positions thereof respectively; a driving position whereby said second clutch means is in the first position thereof and the second brake means is in the second position thereof, and a braking position whereby said second clutch means is in said second position thereof and said second brake means is in the first position thereof.

2. The apparatus of claim 1 wherein said second drive assembly includes two drums rigidly connected together, said first and second frictional surfaces of said second drive assembly being located on an interior surface of the drums of said second drive assembly; said second clutch means comprising a hydraulically actuated shoe and said second brake means comprising a hydraulically actuated shoe.

3. The apparatus of claim 1 wherein said first control means comprises:

piston means for hydraulically controlling the positions of said first clutch means and said first brake means with respect to said first drive assembly.

4. The apparatus of claim 3 wherein said second control means comprises:

piston means for hydraulically controlling the positions of said second clutch means and said second brake means with respect to said second drive assembly.

5. The apparatus of claim 1 wherein said ground engaging means comprises wheels rotatably attached to the frame.

* * * * *